United States Patent
Zhao et al.

(10) Patent No.: US 9,243,407 B2
(45) Date of Patent: Jan. 26, 2016

(54) STRUCTURE REPAIR WITH POLYMER MATRIX COMPOSITES

(71) Applicant: Sikorsky Aircraft Corporation, Stratford, CT (US)

(72) Inventors: Wenping Zhao, Glastonbury, CT (US); Zaffir A. Chaudhry, S. Glastonbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 13/870,182

(22) Filed: Apr. 25, 2013

(65) Prior Publication Data

US 2014/0318057 A1    Oct. 30, 2014

(51) Int. Cl.
| | |
|---|---|
| *B29C 73/10* | (2006.01) |
| *E04C 5/07* | (2006.01) |
| *B64F 5/00* | (2006.01) |
| *B32B 5/02* | (2006.01) |
| *B32B 5/26* | (2006.01) |
| *B32B 7/12* | (2006.01) |

(52) U.S. Cl.
CPC . *E04C 5/07* (2013.01); *B29C 73/10* (2013.01); *B32B 5/024* (2013.01); *B32B 5/26* (2013.01); *B32B 7/12* (2013.01); *B64F 5/0081* (2013.01); *B32B 2260/023* (2013.01); *B32B 2260/046* (2013.01); *B32B 2307/714* (2013.01); *B32B 2605/00* (2013.01); *B32B 2605/18* (2013.01)

(58) Field of Classification Search
CPC .............................. B29C 73/10; B64F 5/0081
USPC ......... 244/133, 129.1, 1 R; 428/297.4, 298.1; 442/242, 246, 248, 251; 264/258, 259; 156/94, 285, 307.1; 52/223.14
See application file for complete search history.

(56) References Cited

U.S. PATENT DOCUMENTS

| | | | |
|---|---|---|---|
| 4,081,941 A * | 4/1978 | Van Ausdall | .................... 52/834 |
| 6,656,299 B1 | 12/2003 | Grosskrueger et al. | |
| 8,262,841 B2 | 9/2012 | Watson et al. | |
| 8,356,649 B2 * | 1/2013 | Cacace et al. | ................ 156/382 |
| 8,398,910 B2 * | 3/2013 | Kastner et al. | ................ 264/258 |
| 2005/0263239 A1 * | 12/2005 | Foo et al. | ........................ 156/94 |
| 2009/0095413 A1 * | 4/2009 | Westre et al. | ................ 156/257 |
| 2012/0077013 A1 | 3/2012 | Kunze et al. | |
| 2012/0096926 A1 * | 4/2012 | Court et al. | ................ 73/29.02 |

* cited by examiner

*Primary Examiner* — Jeanette E Chapman
*Assistant Examiner* — Daniel Kenny
(74) *Attorney, Agent, or Firm* — Cantor Colburn LLP

(57) ABSTRACT

An assembly is provided including a structural component having a flange-like member. A partially cured polymer matrix composite patch is wrapped around a perimeter of the flange-like member. The patch includes a plurality of layers, each layer having a plurality of fibers arranged therein. The layers of the polymer matrix composite patch are cured after being wrapped around the flange-like member of the structural component.

12 Claims, 7 Drawing Sheets

STRUCTURE REPAIR WITH POLYMER MATRIX COMPOSITES

BACKGROUND OF THE INVENTION

Exemplary embodiments of the invention relate to structural components and, more particularly, to a process for forming a polymer composite matrix patch around a structural component of an aircraft.

Aerospace vehicles, such as aircrafts and rotary wing aircrafts, are subjected to different adverse loadings, including the stresses and vibrations that occur during take-off and landing. Under these loading conditions, stress fatigue damage may occur in the structural components that are part of the fuselage of such aircrafts. It is costly and time consuming to repair such damage.

When a structural component of an aircraft is damaged, the structural component is generally replaced, resulting in an excessive amount of time for the aircraft to be non-functional. Due to their light weight, high stiffness, and high strength, polymer matrix composite materials may be used to repair damage that occurs in the structural components of an aircraft. A small pre-formed polymer matrix composite patch may be positioned over the planar surface including the damage to provide additional strength to that area of the structural component. However, over time, the patch may separate or peel away from the surface of the component, leading to further stressing or ultimate failure of the structural component.

BRIEF DESCRIPTION OF THE INVENTION

According to one embodiment of the invention, an assembly is provided including a structural component having a flange-like member. A partially cured polymer matrix composite patch is wrapped around a perimeter of the flange-like member. The patch includes a plurality of layers, each layer having a plurality of fibers arranged therein. The layers of the polymer matrix composite patch are cured after being wrapped around the flange-like member of the structural component.

According to another embodiment of the invention, a method of forming a polymer matrix composite patch about a structural component is provided. An adhesive is applied to a surface of a flange-like member of the structural component. A plurality of layers is wrapped over the adhesive on the surface of the flange-like member. Each of the plurality of layers has a plurality of fibers arranged therein. The layers are cured to form a patch.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
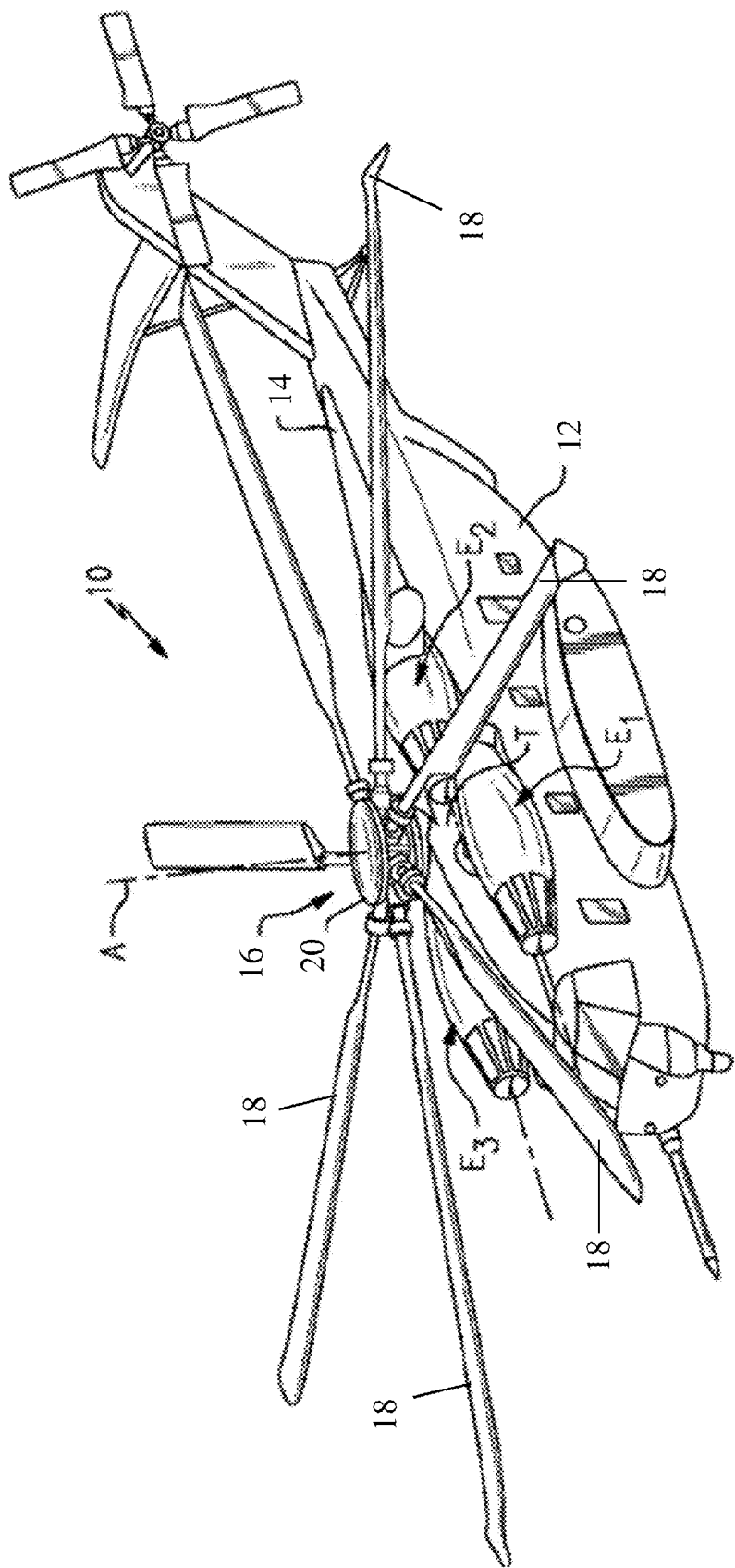
FIG. 1 is a perspective view of an exemplary rotary wing aircraft.
Figure 2:
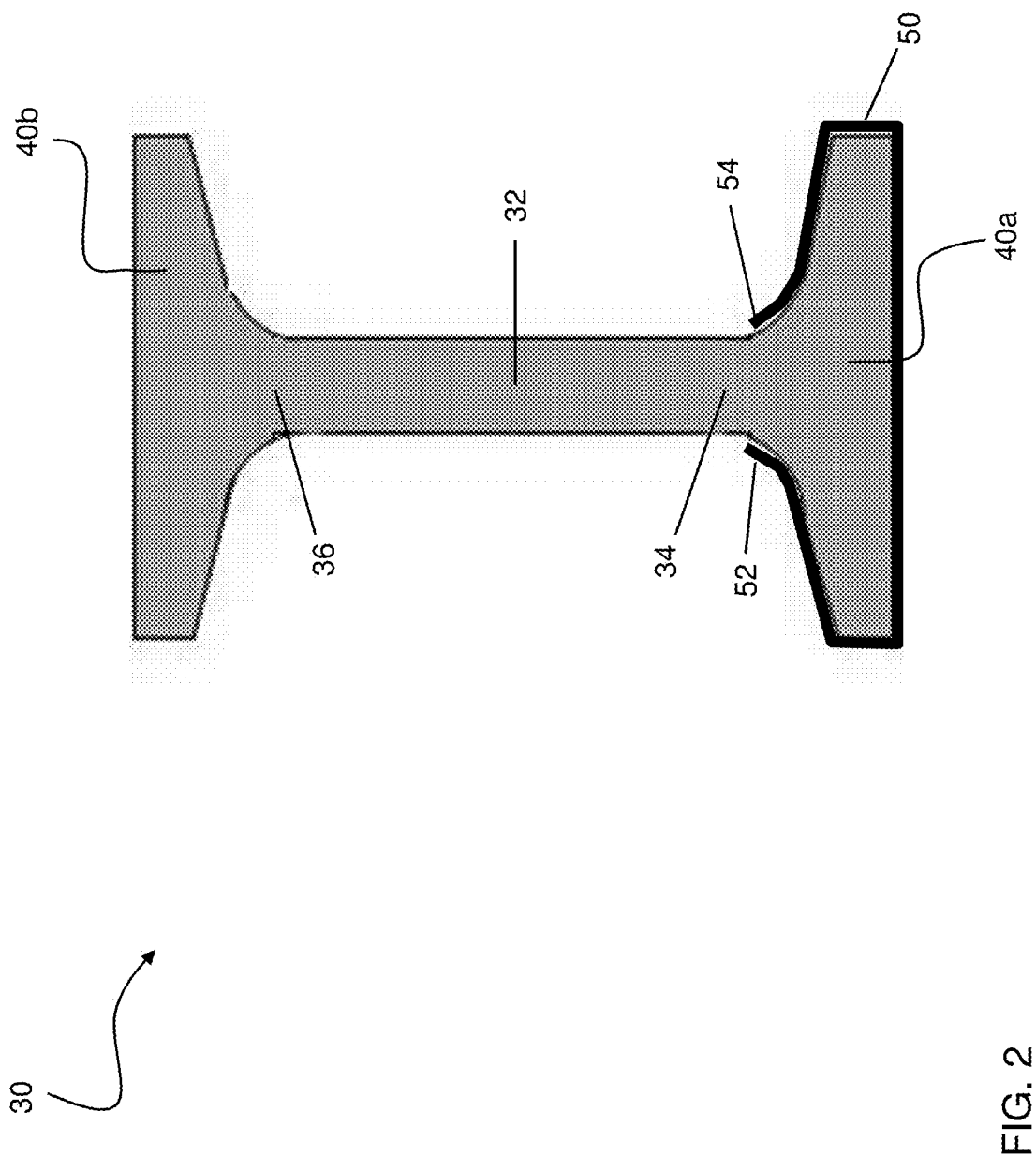
FIG. 2 is a cross-sectional view of a structural component having a polymer matrix composite patch according to an embodiment of the invention.

FIG. 1 schematically illustrates a rotary-wing aircraft 10 including a fuselage 12 having an extended tail 14. A main rotor assembly 16 is mounted on the top of the airframe. The main rotor assembly 16 is driven about an axis of rotation A through a main gearbox by one or more engines E. The main rotor assembly 16 connects blades 18 to a rotor hub 20. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention Referring now to FIGS. 2-4, various structural components 30, such as those within the fuselage 12 of a rotary wing aircraft 10 for example, are illustrated. In one embodiment, each of the various structural components 30 includes at least one flange-like member 40 configured to receive a polymer matrix composite (PMC) patch 50. The structural component 30, illustrated in FIG. 2, is an I-beam including a central portion 32 having a first flange-like member 40a and a substantially identical second flange-like member 40b arranged at opposing ends 34, 36 of the central portion 32. The first flange-like member 40a and the second flange-like member 40b are generally centered about the central portion 32 such that a first portion of both the first flange-like member and the second flange-like member 40a, 40b extends in a first direction from the central portion 32 and a second portion of both the first and second flange-like member 40a, 40b extends in a second, opposite direction from the central portion 32.

Figure 5:
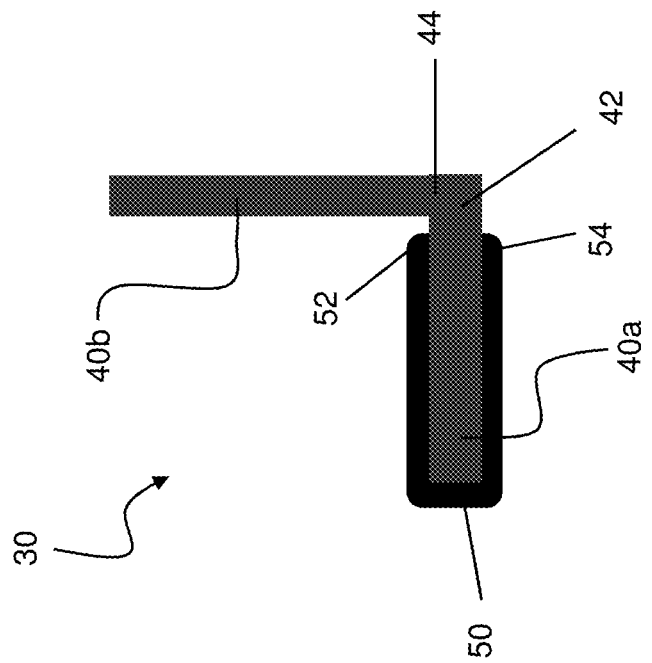
FIG. 5 is a cross-sectional view of a structural component having a polymer matrix composite patch according to an embodiment of the invention.
Figure 4:
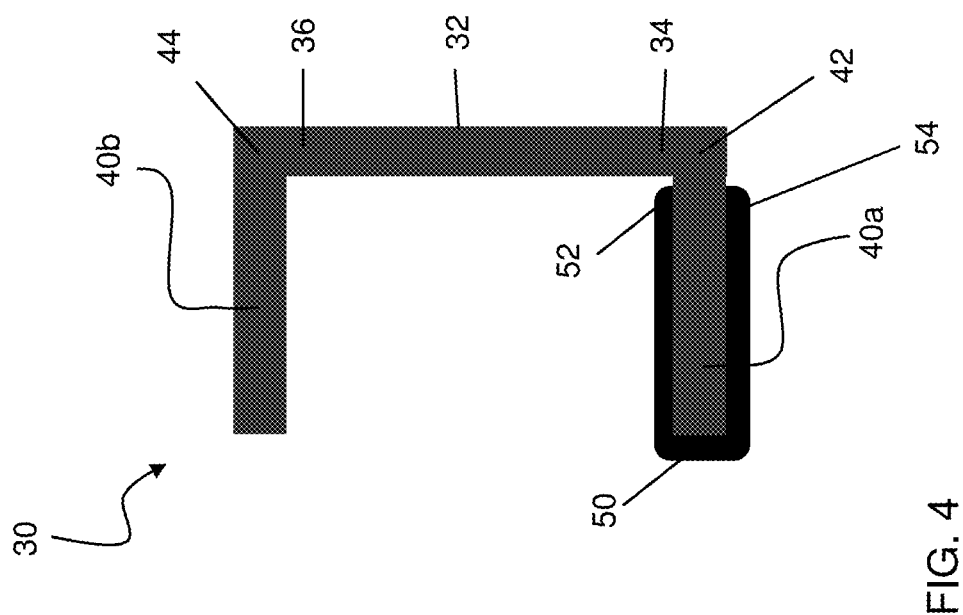
FIG. 4 is a cross-sectional view of a structural component having a polymer matrix composite patch according to an embodiment of the invention.

In another embodiment, the structural component 30 is a C-channel similarly having a central portion 32 with a first flange-like member 40a and a second flange-like member 40b arranged at opposing ends 34, 36 of the central portion 32 (FIG. 4). An end 42, 44 of each flange-like member 40a, 40b is integrally formed with the central portion 32 such that both the first flange-like member 40a and the second flange-like member 40b extend from the central portion 32 in the same first direction. Alternatively, the structural component 30 may be an angle having a first flange-like member 40a and second flange-like member 40b (FIG. 5). A first end 42 of the first flange-like member 40a may be integrally formed with a first end 44 of the second flange-like member 40b such that the first flange-like member 40a and the second flange-like member 40b are arranged generally perpendicular to one another. Although a structural component 30 having an I-beam, C-channel, and angle configuration are illustrated and described in the disclosed non-limiting embodiments, structural components 30 having other configurations, such as generally rounded, non-linear configuration for example, are within the scope of the invention.

Figure 3:
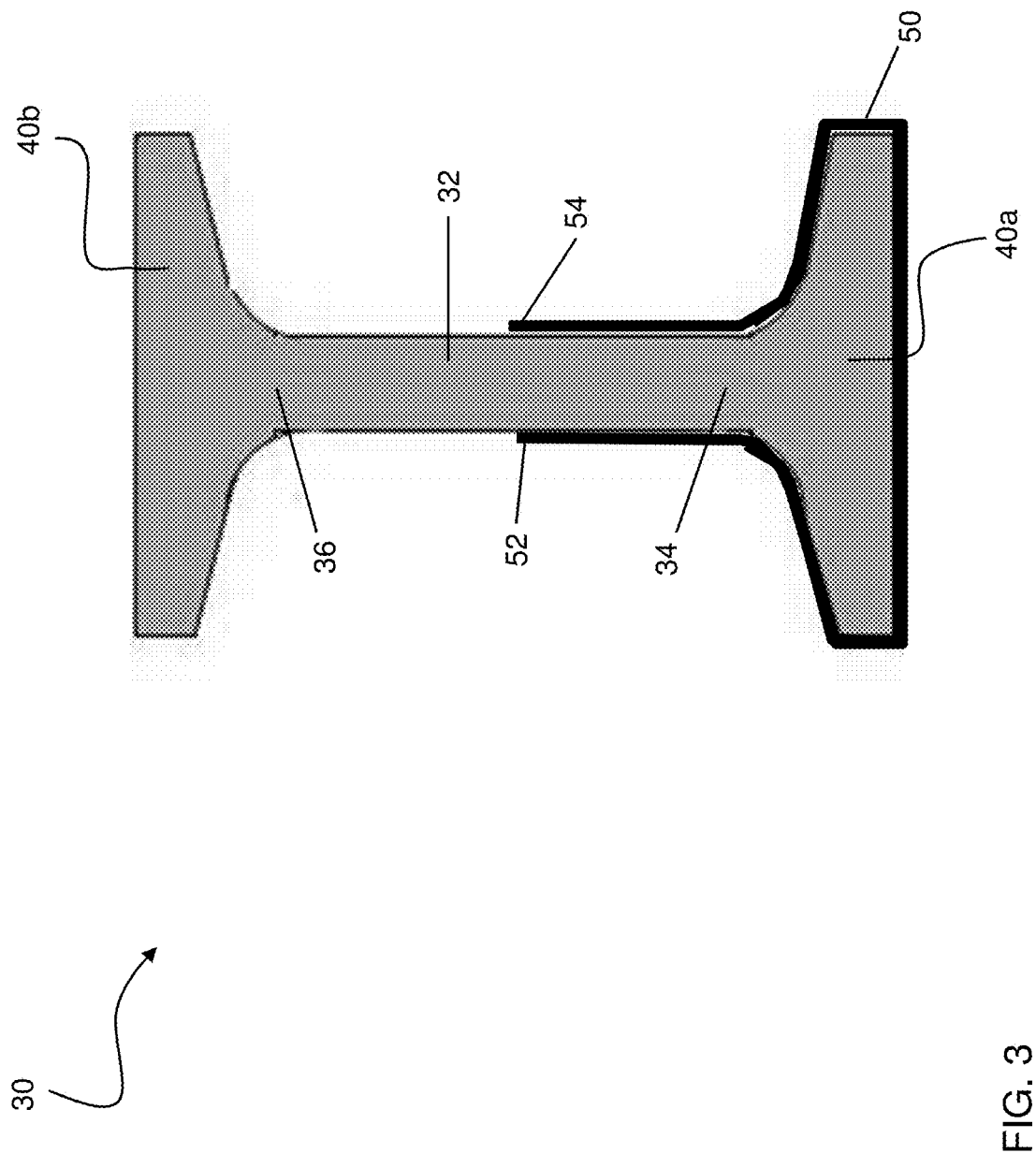
FIG. 3 is a cross-sectional view of a structural component having a polymer matrix composite patch according to an embodiment of the invention.

A patch 50 is formed around a portion of the structural component 30, such as around the first flange 40a for example. The patch 50 is wrapped substantially about the perimeter of the flange 40a, such that a first side 52 and a second, opposite side 54 of the patch 50 are located near each other, generally within the same plane. In one embodiment, the patch 50 extends along the perimeter of the structural component 30 beyond the flange 40a, such as partially along the sides of the central portion 32 for example, as illustrated in FIG. 3. The patch 50 may extend over the full length of the structural component 30, or may be applied locally to only a portion of the component 30. In one embodiment, a small portion of the patch 50 may be cut away or removed to form an opening in the patch. The opening may be used to view the structural component 30 to determine if any damage has occurred.

The patch 50 includes a polymer matrix including reinforcement fibers, such as carbon, fiberglass, S-2 Glass, Graphite, Kevlar, other similar materials, or a combination thereof, which are laid up in multiple plys or layers 53 as generally understood in the art. The size, lay-up (fiber orientation), and number of layers 53 in the patch 50 are determined generally based on the area of the structural component 30 to which the patch 50 is being applied, the nature of the damage that has or is expected to occur, and the stress of the structural component 30. In one embodiment, the lay-up of at least one of the layers 53 of the patch 50 is generally aligned with the load path of the structural component 30.

In one embodiment, the patch 50 is formed around the structural component 30 as a "preemptive repair." The determination of where damage is likely to occur may be based on damage of other similarly loaded structural components 30 or based on a stress analysis of the loading of the structural component 30. Alternatively, the patch 50 may be applied to a structural component 30 after the occurrence of a crack or other localized damage. To fix damage that has already occurred, the patch 50 may be formed in-situ around the structural component 30 while still assembled as part of rotary wing aircraft 10.

Figure 6:
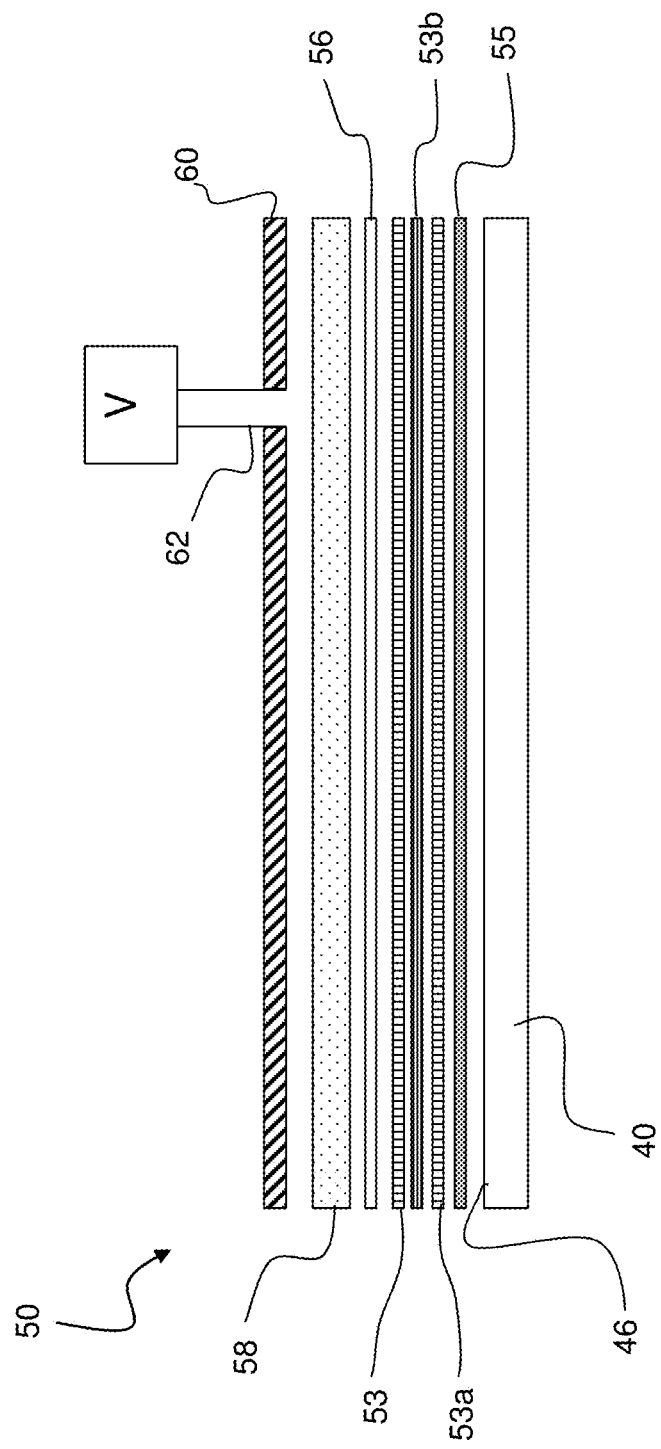
FIG. 6 is a detailed cross-sectional view of a polymer matrix composite patch according to an embodiment of the invention.
Figure 7:
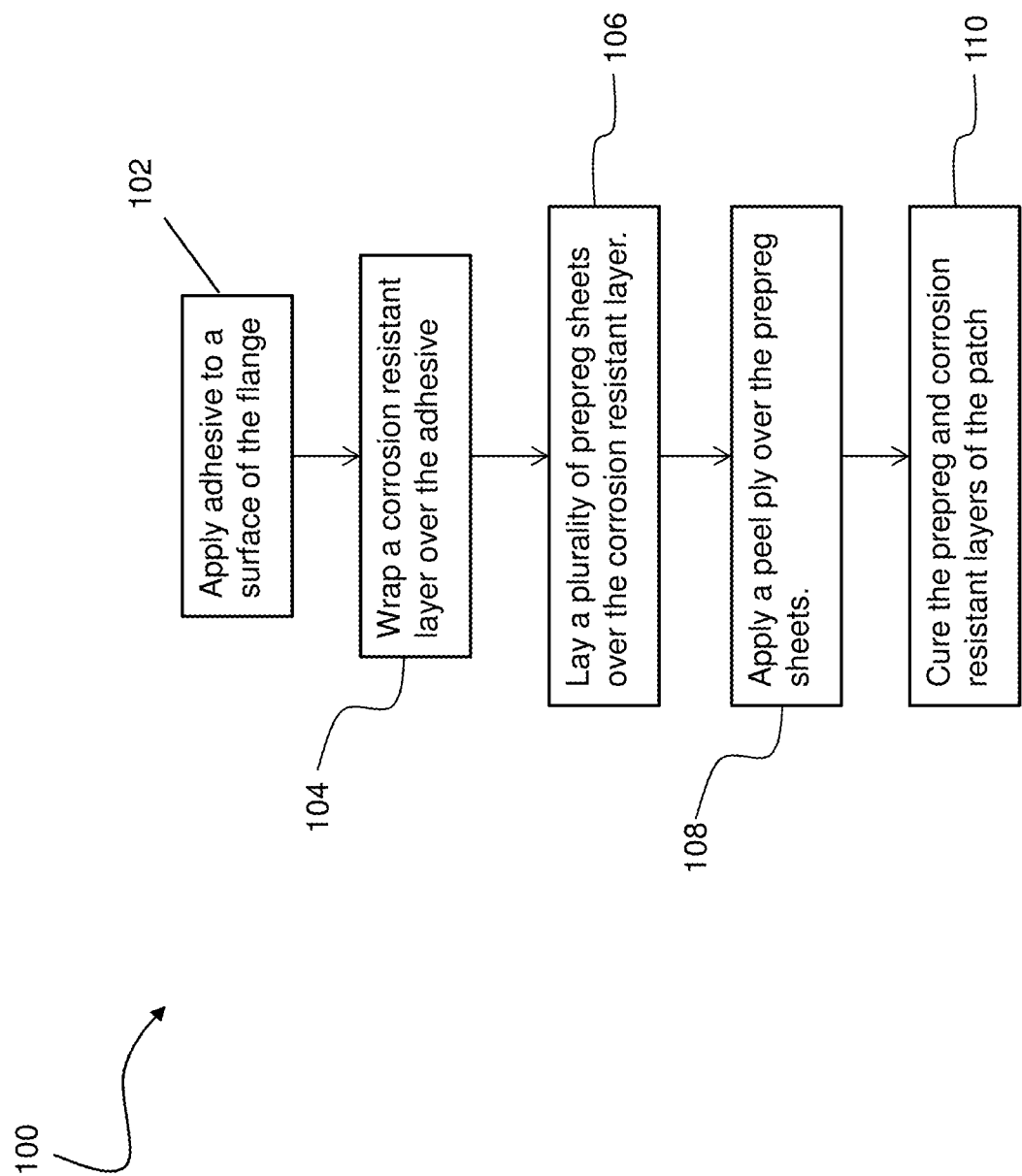
FIG. 7 is a method of forming a polymer matrix composite patch around a portion of a structural component according to an embodiment of the invention.

A method 100 of forming a polymer matrix composite patch 50 about a portion of a structural component 30 is illustrated in FIGS. 6 and 7. In block 102, an adhesive (not shown) is initially applied to the clean, substantially smooth surface 46 of the flange 40 of the structural component 30. In one embodiment, a corrosion resistant layer 55 is wrapped about the flange 40, overlaying the adhesive in block 104 (FIG. 6). The corrosive resistant layer 55 may be formed from a glass fiber or other material that prevents galvanic corrosion between the structural component 30 and the patch 50. A plurality of thin, flat, substantially rigid sheets or layers 53 of partially cured epoxy resin having fibers embedded therein, also referred to in the art as a prepreg sheet, are laid over the corrosion resistant layer 55 in block 106. For example, a first prepreg sheet 53a may be wrapped about the corrosion resistant layer 55. A second, substantially similar prepreg sheet 53b is then similarly laid over the first prepreg sheet 53a. The first and second prepreg sheets 53a, 53b may be oriented about the flange 40a such that the fibers embedded therein have a desired orientation relative to the surface of the flange 40. As a result, the lay-up of the first and second prepreg sheets 53a, 53b may vary, or alternatively, may be substantially identical, depending on the requirements of the patch 50. A plurality of prepreg sheets 53 are layered over one another until a desired final thickness has been reached. Once the patch 50 has a desired thickness, a peel ply 56 may be placed over the top of the prepreg sheet 53, in block 108.

The plurality of prepreg layers 53 and the corrosion resistant layer 55 are then cured in block 110 to form a patch 50. To cure the patch 50, a heating blanket 58 may be positioned adjacent the peel ply 56. The heating blanket 58 is generally shaped to cover the entire surface of the patch 50 as it is wrapped around the flange 40. A vacuum bagging film 60 is placed around the heating blanket 58 and is secured to the surface of the flange 40 or the structural component 30 with a sealant. In an exemplary embodiment, a layer of breather cloth (not shown) is inserted between the heating blanket 58 and the bagging film 60 to provide a continuous air path for a vacuum. A port 62 extends through the bagging film 60 and is configured to connect to a vacuum pump, illustrated schematically at V. Heat from the heating blanket 58 softens and then cures the material within each of the plurality of layers 53 and suction from the vacuum pump V applies a uniform pressure over the patch 50.

Figure 8:
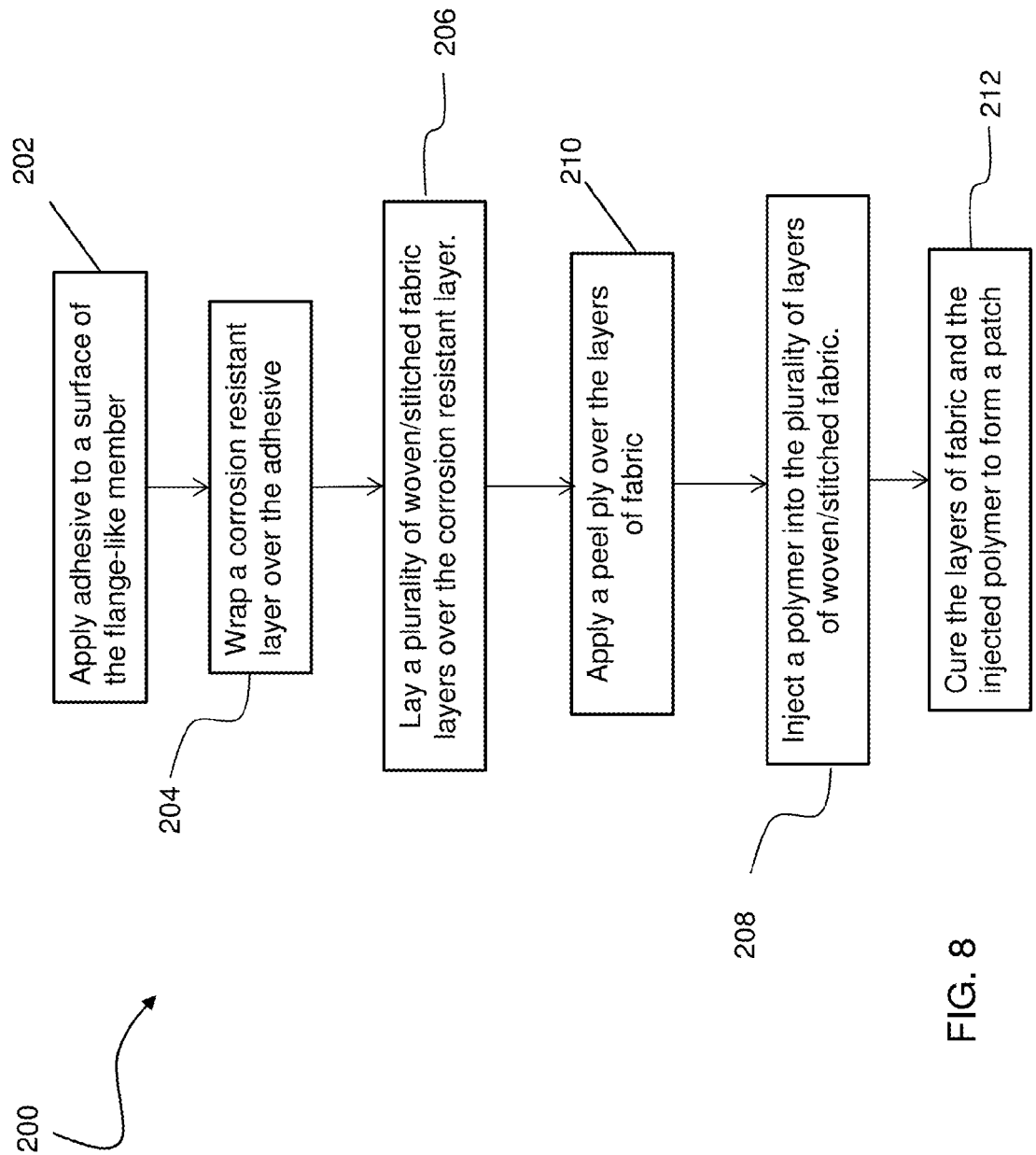
FIG. 8 is a method of forming a polymer matrix composite patch around a portion of a structural component according to an embodiment of the invention.

Another method 200 of forming the polymer matrix composite patch 50 about a portion of a structural component 30 is illustrated in FIG. 8. In block 202, an adhesive (not shown) is initially applied to the clean, substantially smooth surface 46 of the flange 40 of the structural component 30. As previously described, a corrosion resistant layer 55 may be wrapped about the flange 40, overlaying the adhesive in block 204. Multiple layers of fibers woven or stitched into a fabric 53 are arranged over the corrosion resistant layer until a desired final thickness has been achieved in block 206. The fiber orientation of each layer of the fabric when positioned around the structural component 30 may be substantially similar, or alternatively, may be different. In block 208, once the patch 50 has a desired thickness, a polymer, such as epoxy resin for example, is injected, such as with vacuum for example, into the layers 53 of the patch 50. A peel ply 56 may be placed over the top layer of fabric 53, in block 210. In block 212, the plurality of layers of fabric 53 and the polymer are cured, such as with a heating blanket 58 with reference to the method of FIG. 7.

By wrapping the patch 50 around a flange 40, the patch 50 has an improved peel and strength which significantly resists the tendency of the patch 50 to peel away from the surface of the structural component 30. Wrapping the patch also increases the bonding surface area and the load transfer capability of the patch 50, while reducing the thickness, and therefore the stress concentration associated with the thickness of the patch 50. Because the patch 50 is cured in-situ, the patch 50 conforms better to the shape of the structural component 30 than a preformed patch 50.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of forming a polymer matrix patch about a load-bearing, metallic structural component, comprising:

wrapping a plurality of layers around the surface of a flange-like member of the load-bearing, metallic structural component in-situ, such that the patch extends parallel to an axis of the flange-like member and wraps equidistantly, over two opposing sides of the load-bearing metallic structural component such that a first end and a second, opposite end of each the plurality of layers is arranged within a same plane on opposing sides of the structural component, each layer having a plurality of fibers arranged therein; and curing the plurality of layers.

2. The method according to claim 1, further comprising applying an adhesive to the surface of the flange-like member of the load-bearing, metallic structural component.

3. The method according to claim 1, further comprising wrapping a corrosion resistant layer over the adhesive.

4. The method according to claim 1, wherein the patch is formed about the load-bearing, metallic structural component while the load-bearing, metallic structural component remains assembled within an aircraft.

5. The method according to claim 1, wherein the patch is formed about the load-bearing, metallic structural component during manufacture of the load-bearing, metallic structural component.

6. The method according to claim 1, wherein the plurality of fibers embedded in at least one of the plurality of layers is generally aligned with a load path of the load-bearing, metallic structural component.

7. The method according to claim 1, wherein an orientation of the plurality of fibers of each layer varies.

8. The method according to claim 1, wherein heat and pressure are applied to the plurality of layers to cure the layers into a patch.

9. The method according to claim 7, wherein the heat is generated by a heating blanket positioned adjacent the plurality of layers.

10. The method according to claim 7, wherein the pressure is generated by a vacuum connected to a film positioned adjacent the plurality of layers.

11. The method according to claim 1, wherein each of the plurality of layers is a partially cured prepreg sheet.

12. The method according to claim 1, wherein each of the plurality of layers is a woven fabric or a stitched fabric.

* * * * *